US012365123B2

(12) United States Patent
Niuyama

(10) Patent No.: US 12,365,123 B2
(45) Date of Patent: Jul. 22, 2025

(54) PLASTICIZING DEVICE, INJECTION MOLDING DEVICE, THREE DIMENSIONAL SHAPING DEVICE

(71) Applicant: SEIKO EPSON CORPORATION, Tokyo (JP)

(72) Inventor: Masato Niuyama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 139 days.

(21) Appl. No.: 18/323,622

(22) Filed: May 25, 2023

(65) Prior Publication Data

US 2023/0382030 A1 Nov. 30, 2023

(30) Foreign Application Priority Data

May 26, 2022 (JP) ................. 2022-085848

(51) Int. Cl.
*B29C 45/46* (2006.01)
*B29C 45/74* (2006.01)
*B29C 45/78* (2006.01)

(52) U.S. Cl.
CPC ............ *B29C 45/464* (2013.01); *B29C 45/74* (2013.01); *B29C 45/78* (2013.01); *B29C 2945/76531* (2013.01); *B29C 2945/76665* (2013.01); *B29C 2945/76832* (2013.01)

(58) Field of Classification Search
CPC .................................................. B29C 45/464
See application file for complete search history.

(56) References Cited

U.S. PATENT DOCUMENTS

2018/0311894 A1 11/2018 Saito et al.
2020/0307091 A1* 10/2020 Kobayashi ............ B29C 64/118

FOREIGN PATENT DOCUMENTS

EP 3446853 A1 * 2/2019 .............. B22F 10/18
JP 2018-187777 A 11/2018

* cited by examiner

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

A plasticizing device includes a first flat screw including a first groove forming surface in which a groove is formed and configured to rotate; a second flat screw including a second groove forming surface in which a groove is formed and configured to rotate; a barrel including a first facing surface facing the first groove forming surface and a second facing surface facing the second groove forming surface and formed with a communication hole through which a plasticized material is fed outside; and a heating section configured to heat the material supplied to the grooves of the first flat screw and of the second flat screw.

9 Claims, 9 Drawing Sheets

PLASTICIZING DEVICE, INJECTION MOLDING DEVICE, THREE DIMENSIONAL SHAPING DEVICE

The present application is based on, and claims priority from JP Application Serial Number 2022-085848, filed May 26, 2022, the disclosure of which is hereby incorporated by reference herein in its entirety.

BACKGROUND

1. Technical Field

The present disclosure relates to a plasticizing device, an injection molding device including the plasticizing device, and a three dimensional shaping device including the plasticizing device.

2. Related Art

In order to reduce the size of injection molding devices, an injection molding device in which a related art screw is replaced with a rotor has been proposed. For example, a three dimensional shaping device including a plasticizing section configured to include a flat screw having a plurality of scroll-shaped grooves and a screw facing section was proposed in JP-A-2018-187777. A screw facing surface is formed, for example, on one surface of a barrel facing the flat screw. According to JP-A-2018-187777, a material is plasticized by the rotation of the flat screw. In a range in which the number of the screw rotations is 24 rpm or less, the injection amount increases substantially linearly with increase in the number of the screw rotations. On the other hand, there is also a description that when the number of the screw rotations exceeds 24 rpm, the injection amount hardly increases even if the number of the screw rotation is increased. However, there is room for improvement in a plasticizing section of JP-A-2018-187777. Specifically, when an attempt is made to increase the amount of a plasticization per unit time in a plasticizing device including a flat screw such as JP-A-2018-187777, a method of increasing the number of rotations of the flat screw is conceivable, however, as described in JP-A-2018-187777, when the number of rotations exceeds a certain number of rotations, the amount of plasticization hardly increases and becomes constant. In other words, there is a problem that a plasticizing ability is saturated. In addition, although a method of increasing a diameter of the flat screw can be considered, there is a problem that the size of the entire device is increased, for example, it is necessary to increase the size of the motor.

SUMMARY

The present disclosure is made to solve at least a part of the problems described above, and can be realized as the following application examples or modes.

Application Examples

A plasticizing device according to an aspect of the present application includes a first flat screw including a first groove forming surface in which a groove is formed and configured to rotate; a second flat screw including a second groove forming surface in which a groove is formed and configured to rotate; a barrel including a first facing surface facing the first groove forming surface and a second facing surface facing the second groove forming surface and formed with a communication hole through which a plasticized material is fed outside; and a heating section configured to heat the material supplied to the grooves of the first flat screw and of the second flat screw.

A injection molding device according to an aspect of the present application includes the plasticizing device described above; a nozzle section configured to inject a material plasticized by the plasticizing device; and a fixing section configured to fix a molding die for receiving the material.

A three dimensional shaping device according to an aspect of the present application includes the plasticizing device described above; a nozzle section configured to eject a material plasticized by the plasticizing device; and a stage including a shaping surface on which the material is laminated.

DESCRIPTION OF EMBODIMENTS

First Embodiment

Overview of the Injection Molding Device

Figure 1:
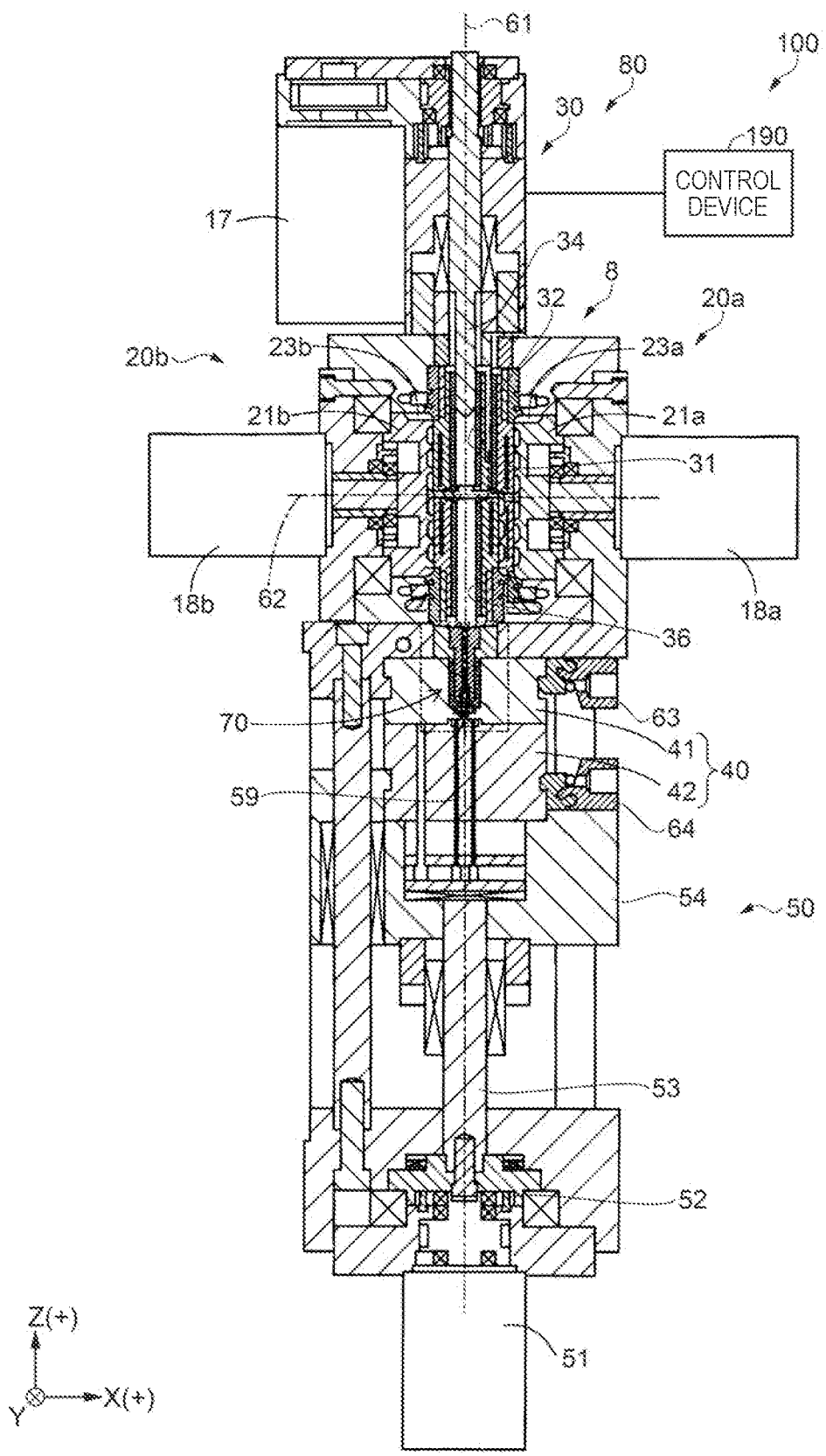
FIG. 1 is a cross-sectional view showing schematic configuration of an injection molding device according to a first embodiment.
Figure 2:
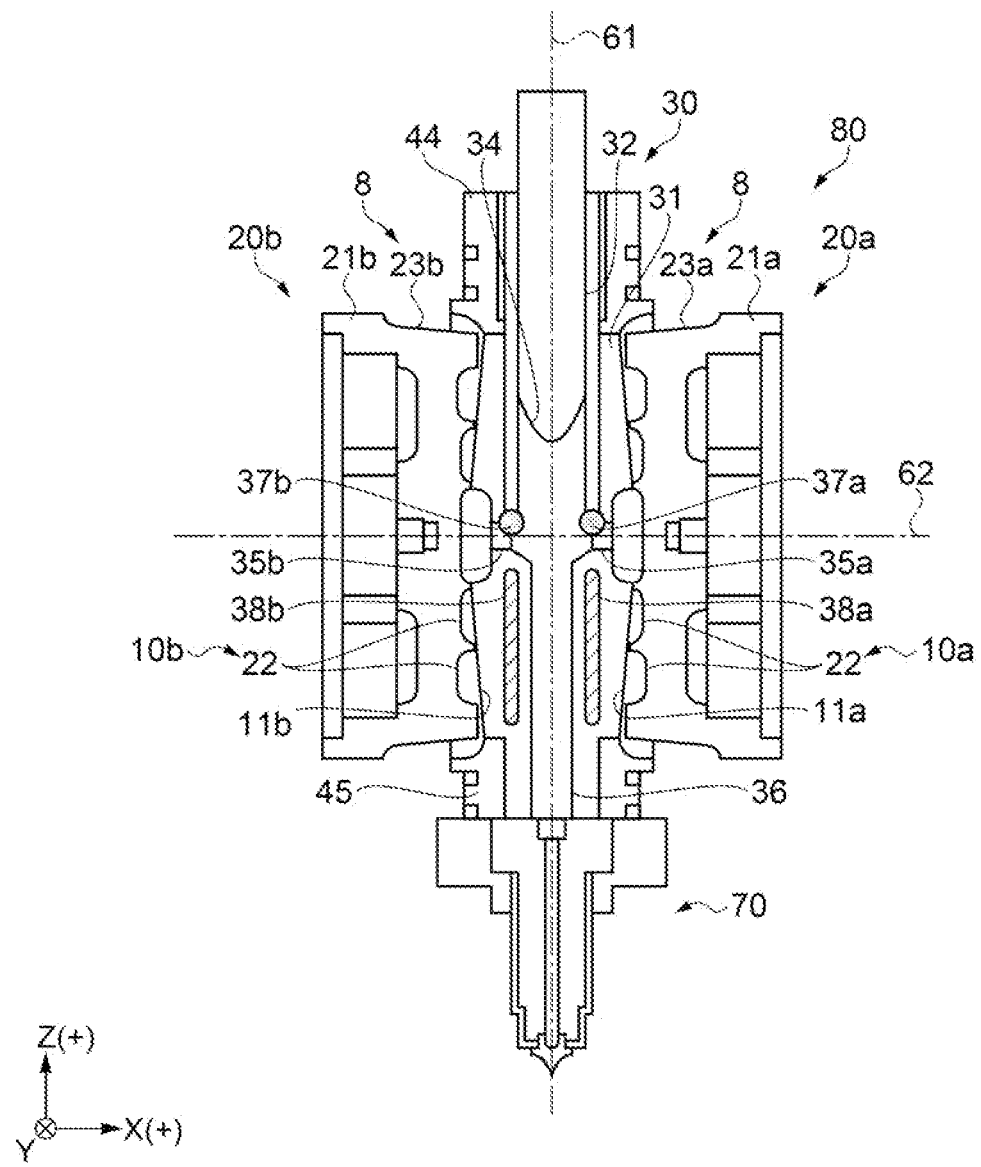
FIG. 2 is an enlarged cross-sectional view of a periphery of a plasticizing section.
Figure 9:
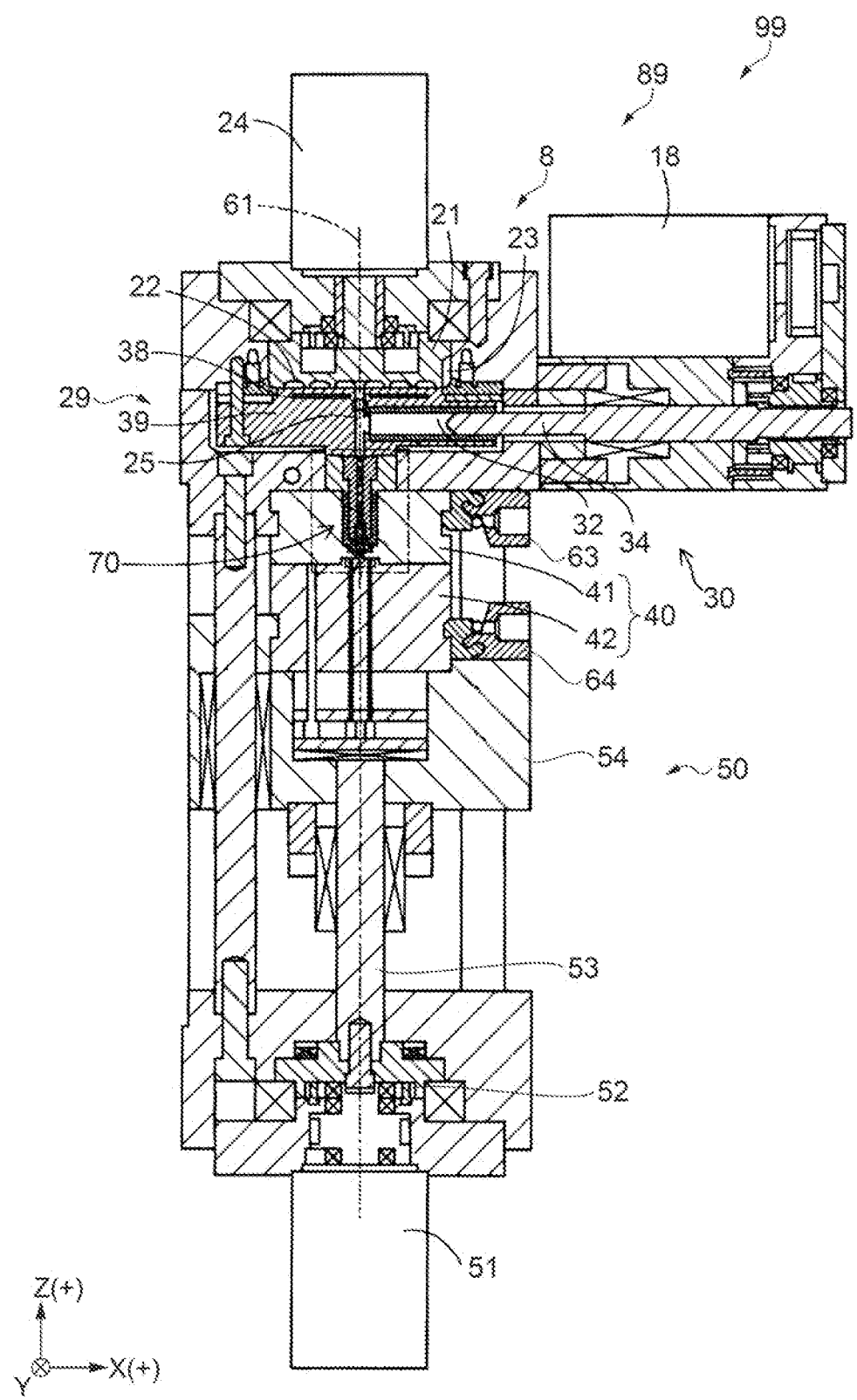
FIG. 9 is a schematic configuration diagram of an injection molding device of a comparative example.

FIG. 1 is a cross-sectional view showing a schematic configuration of an injection molding device. FIG. 9 is a schematic configuration diagram of an injection molding device of a comparative example. FIG. 2 is an enlarged cross-sectional view of a periphery of a plasticizing section.

First, with reference to FIG. 9, a configuration of an injection molding device 99 of a comparative example including a plasticizing section of JP-A-2018-187777 will be described.

As shown in FIG. 9, the related art injection molding device 99 includes a plasticizing device 89 and a mold clamping device 50. The plasticizing device 89 includes a plasticizing section 29 including a flat screw 21 having a plurality of scroll-shaped grooves 22 and a barrel 39 facing the flat screw 21. When a material is supplied from a material supply section 8 including a hopper (not shown) to a supply port 23 provided on a side surface of the flat screw 21, the material is plasticized by a rotation of the flat screw 21 and heating by a heater 38 in the barrel 39, and is injected into a molding die 40 fixed to the mold clamping device 50 from a nozzle section 70 through a through hole 25 at a center of the barrel 39.

A branch path 32 is provided in the through hole 25. A rod-shaped plunger 34 that reciprocates inside the branch path 32 is provided inside the branch path 32, and adjusts the amount of the material that is pressure-fed to the nozzle section 70.

As described above, the related art plasticizing device 89 is configured to include one plasticizing section 29 including the flat screw 21 and the barrel 39.

On the other hand, a plasticizing device 80 of an injection molding device 100 according to the present embodiment shown in FIG. 1 includes two plasticizing sections 20a,20b. As a result, a plasticizing ability of the material is enhanced more than that of the related art plasticizing device 89, and a compact configuration is realized.

Hereinafter, a configuration of the injection molding device 100 according to the present embodiment will be described in detail. In each drawing, three axes orthogonal to each other, that is, an X-axis, a Y-axis, and a Z-axis, are illustrated. An extending direction of the nozzle section 70 is defined as an extending direction of the Z-axis. A line segment passing through a center of the nozzle section 70 along the Z-axis is defined as a center line 61. A line segment intersecting with the center line 61 and extending along the X-axis is defined as a rotation axis 62.

Overview of the Plasticizing Device

The injection molding device 100 includes a plasticizing device 80, a mold clamping device 50, a control device 190, and the like.

The plasticizing device 80 includes the two plasticizing sections 20a, 20b, an injection control section 30, and the like. The plasticizing section 20a includes a flat screw 21a, a drive motor 18a, a barrel 31, and the like.

The flat screw 21a is driven to rotate about a rotation axis 62 by a drive motor 18a provided with a decelerator. Similarly, the flat screw 21b is driven to rotate about the rotation axis 62 by a drive motor 18b, which is provided with a decelerator. In other words, the drive motor 18a as a first drive section rotates the flat screw 21a as a first flat screw, and the drive motor 18b as a second drive section rotates the flat screw 21b as a second flat screw.

As shown in FIG. 2, the flat screw 21a includes a groove forming surface 10a in which a plurality of scroll-shaped grooves 22 are formed. The groove forming surface 10a faces a facing surface 11a of the barrel 31. The barrel 31 is one common member corresponding to the two flat screws 21a, 21b, and includes two facing surfaces 11a, 11b. The facing surface 11b is provided symmetrically with respect to the facing surface 11a with the center line 61 as the axis of symmetry. The flat screw 21b includes a groove forming surface 10b in which a plurality of scroll-shaped grooves 22 are formed, and the groove forming surface 10b faces the facing surface 11b of the barrel 31. In other words, the groove forming surface 10a as a first groove forming surface and the groove forming surface 10b as a second groove forming surface are located to face each other. In the barrel 31, the facing surface 11a as a first facing surface and the facing surface 11b as a second facing surface are provided to face the opposite side.

Figure 3:
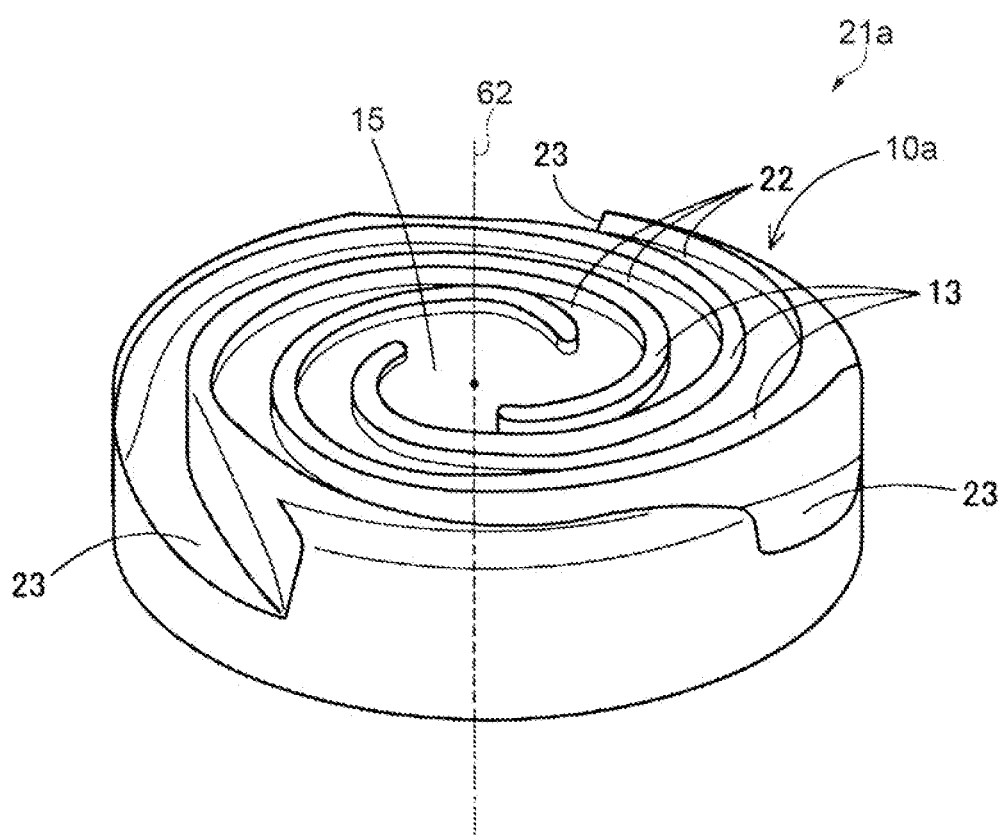
FIG. 3 is a perspective view of an aspect of a rotor.

FIG. 3 is a perspective view showing a schematic configuration of a rotor.

As shown in FIG. 3, the flat screw 21a has a substantially cylindrical shape in which a height in the direction along the rotation axis 62 is smaller than the length (diameter) in a direction intersecting the rotation axis 62. The flat screw 21a is a disk-shaped member including spiral grooves on its surface, and is also referred to as a rotor or a scroll. In the groove forming surface 10a, three spiral grooves 22 are provided around a flat central section 15 through which the rotation axis 62 passes. In a preferred example, the grooves 22 are so-called scroll grooves, which spiral from the central section 15 toward an outer peripheral surface and communicate with supply ports 23 formed in a side surface of the flat screw 21a. Three grooves 22 are defined by three ridge sections 13 as side walls.

In plan view, the three supply ports 23 of the three grooves 22 are provided on the side surface of the flat screw 21a at positions spaced apart from each other by approximately 120 degrees around the rotation axis 62. The number of the grooves 22 is not limited to three, and an arbitrary number of one or two or more grooves 22 and ridge sections 13 may be provided. The same applies to the flat screw 21b.

Figure 4:
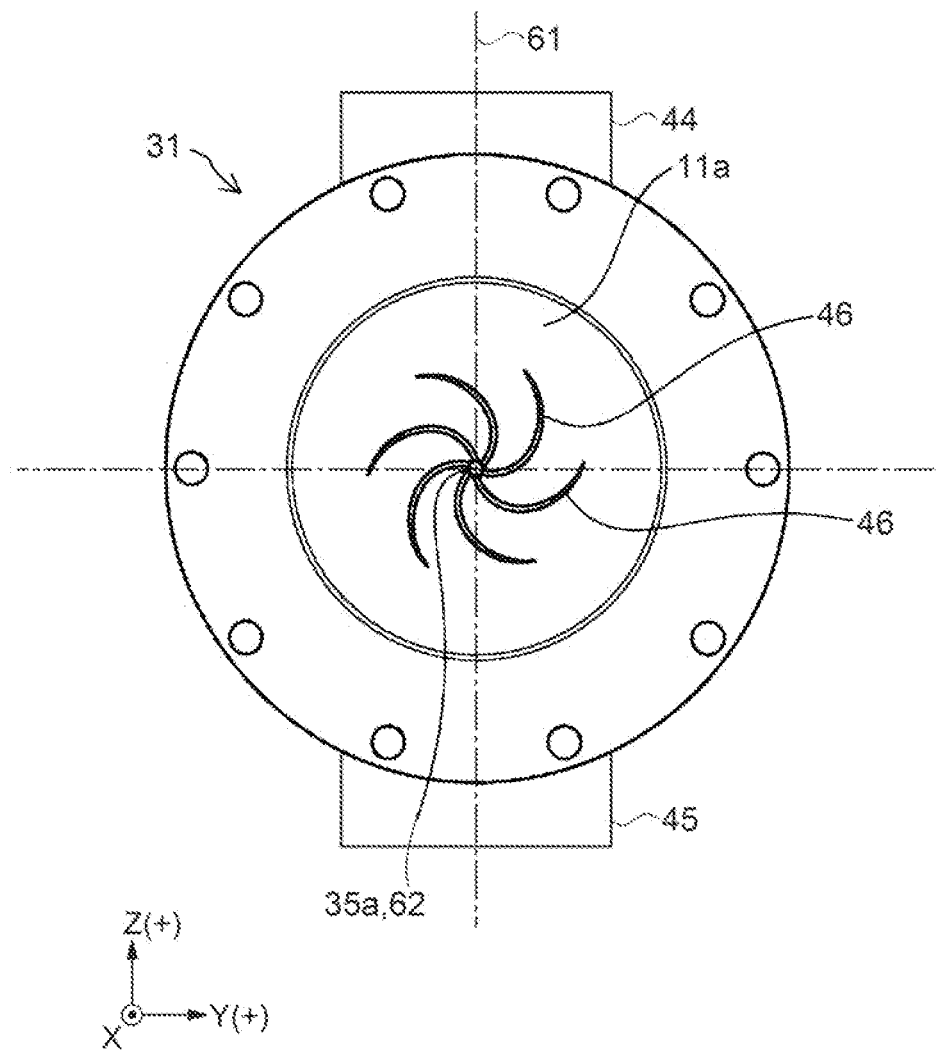
FIG. 4 is a plan view of a barrel.

FIG. 4 is a plan view showing a schematic configuration of the barrel, and is a plan view in which the facing surface 11a is faced forward from the X plus direction.

As shown in FIG. 4, the barrel 31 has a substantially circular shape, and includes, at the center thereof, a facing surface 11a that faces the groove forming surface 10a of the flat screw 21a.

A through hole 35a is provided at a center of the facing surface 11a. The center of the through hole 35a substantially coincides with the rotation axis 62. The facing surface 11a is provided with a plurality of guide grooves 46 extending spirally from the through hole 35a toward the outer periphery. Although six guide grooves 46 are provided in FIG. 4, the number of guide grooves 46 is not limited to six, and any number is sufficient as long a plurality of guide grooves 46 are provided. One end of the guide grooves 46 may not be directly connected to the through hole Also, the barrel 31 may not be formed with guide grooves 46. The same applies to the facing surface 11b (FIG. 2).

In other words, the barrel 31 includes the facing surface 11a as a first facing surface facing the groove forming surface 10a as a first groove forming surface and an facing surface 11b as a second facing surface facing the groove forming surface as a second groove forming surface. Further, a communication hole 36 (FIG. 2) through which the plasticized material is fed outside is formed in the barrel 31.

Further, a connection section 44 for connecting to a branch path 32 (FIG. 2) is provided on a Z plus side of the barrel 31. A connection section 45 for connecting to a nozzle section 70 (FIG. 2) is provided on a Z minus side of the barrel 31.

Return to FIG. 2.

The through hole 35a, 35b of the barrel 31 are provided along the rotation axis 62, and both outlets thereof communicate with the communication hole 36. The communication hole 36 is a flow path communicating with the nozzle section 70 along the center line 61. As shown in FIG. 2, the communication hole 36 is located between the groove forming surface 10a and the groove forming surface 10b. The branch path 32 is provided in the Z plus direction of the communication hole 36. The branch path 32 is a cylindrical cylinder extending along the center line 61, and communicates with the communication hole 36. A plunger 34 is disposed inside the branch path 32. That is, the communication hole 36 and the branch path 32 branch off the through holes 35a, 35b.

As described above, the communication hole 36 and the branch path 32 are linearly arranged, and the flat screws 21a, 21b are provided so as to sandwich both of them, whereby a compact configuration is realized while two plasticizing sections 20a, 20b are provided.

As shown in FIG. 2, the branch path 32 and the communication hole 36 extend along the groove forming surface 10a and the groove forming surface 10b in the preferred example, but the present disclosure is not limited to this configuration, and it is sufficient if they extend along at least one of the groove forming surfaces.

The injection control section 30 is configured to include a drive motor 17 (FIG. 1) provided with a decelerator, a ball screw (not shown), and the like, and controls an amount of material supplied to the communication hole 36 by reciprocating the plunger 34 in the branch path 32. Specifically, by moving the plunger 34 in the Z plus direction, the material is drawn into the branch path 32 and weighed, and by moving the plunger 34 in the Z minus direction, the material is pressure-fed into the communication hole 36. In other words, the injection control section 30 as a suction feeding section includes the branch path 32 communicating with the communication hole 36, and sucks the plasticized material to the branch path 32 or feeds the sucked material to the communication hole 36 side.

A check valve 37a is provided on the branch path 32 side of the through hole 35a of the barrel 31. Similarly, a check valve 37b is provided on the branch path 32 side of the through hole 35b. The check valves 37a, 37b permit flow of the material toward the nozzle section 70 side in the communication hole 36 and suppress reverse flow of the material toward the through holes 35b side.

A heater 38a as a first heating section and a heater 38b as a second heating section are provided in the barrel 31. The heater 38a is a heater for the plasticizing section 20a, and is provided between the communication hole 36 and the flat screw 21a. Similarly, the heater 38b is a heater for the plasticizing section 20b, and is provided between the communication hole 36 and the flat screw 21b. In other words, the heating section includes a heater 38a for the flat screw 21a and a heater 38b for the flat screw 21b, and heats the material supplied to the grooves 22 of the flat screw 21a and the flat screw 21b. The heaters 38a, 38b may not be provided inside the barrel 31, but may be provided inside the flat screws 21a, 21b, for example. Further, the heaters 38a, 38b may not be provided corresponding to each of the flat screws 21a, 21b, and a heater 38 common to the flat screws 21a, 21b may be provided.

Figure 5:
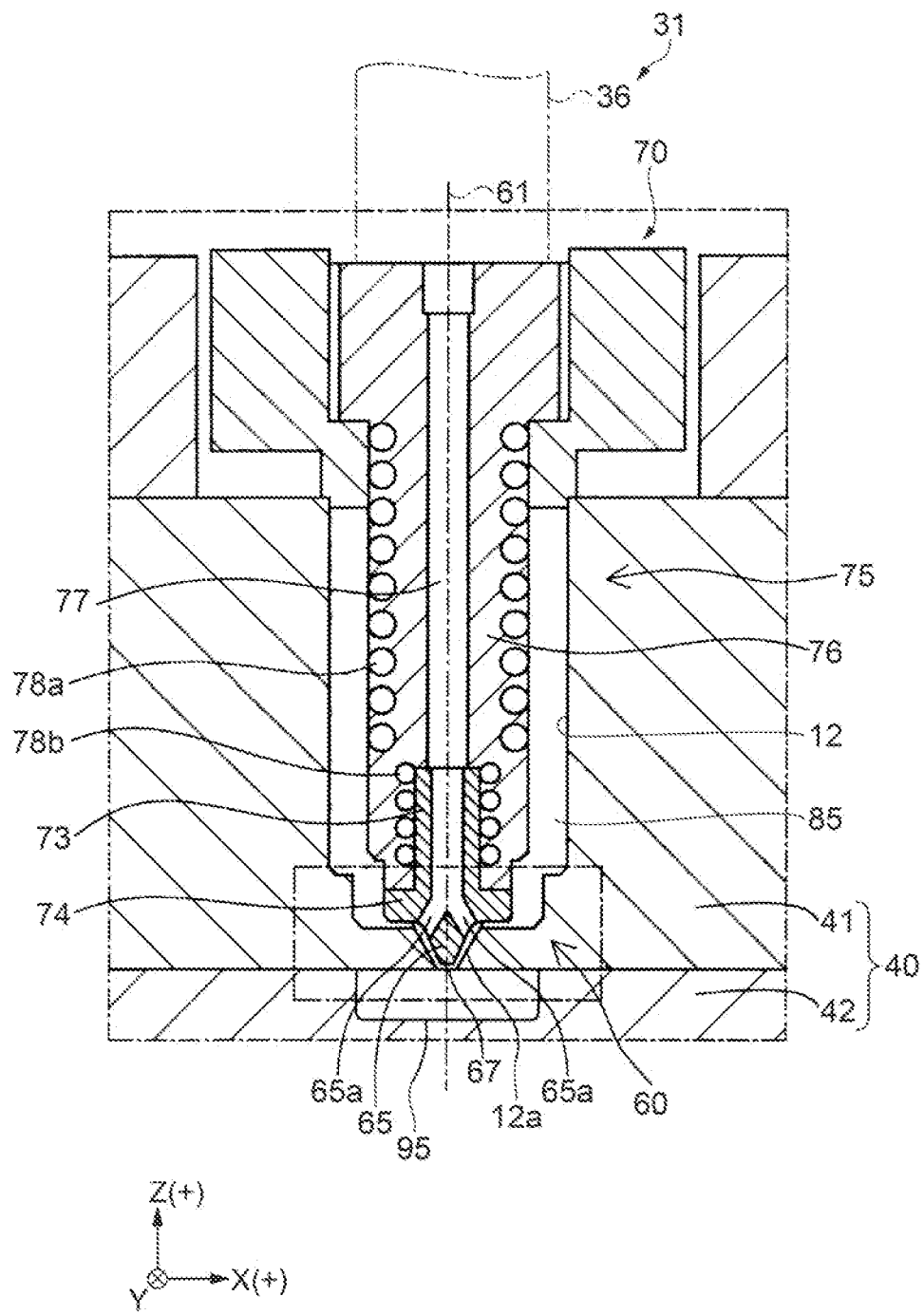
FIG. 5 is an enlarged cross-sectional view of a periphery of a nozzle section.

FIG. 5 is an enlarged cross-sectional view of the nozzle section.

As shown in FIG. 5, the nozzle section 70 is disposed directly below the barrel 31, and the central flow path 77 thereof communicates with the communication hole 36 of the barrel 31.

The nozzle section 70 is inserted into an attachment hole 12 of an upper molding die 41 in a molding die 40. The molding die 40 includes the upper molding die 41 which is a fixed molding die and a lower molding die 42 which is a movable molding die.

The attachment hole 12 of the upper molding die 41 is formed such that the inner diameter thereof is gradually reduced as it becomes deeper in the Z minus direction from an opening section. An end section 12a of the deepest section of the attachment hole 12 is formed in a substantially conical shape with an inner diameter that gradually decreases. A tip of the end section 12a functions as a gate opening 67 through which a molding material is injected. The gate opening 67 is formed as a substantially circular hole.

A portion of the nozzle section 70 inserted into the attachment hole 12 is referred to as a hot runner 75. As shown in FIG. 5, the hot runner 75 includes a main body section 76, an injection section 60, heaters 78a, 78b, and the like. The plasticized material is filled around the hot runner 75 in the attachment hole 12.

The main body section 76 has a substantially cylindrical shape, and a female screw (not shown) is formed on an inner peripheral surface of an end section on the gate opening 67 side.

The injection section 60 includes a connection section 73, a flange section 74, and a tip end section 65, and the like.

The connection section 73 has a substantially cylindrical shape, and a male screw (not shown) is formed on an outer peripheral surface thereof. This male screw and the female screw of the main body section 76 are screwed together, and the connection section 73 is fixed to the inside of the main body section 76.

The flange section 74 is a flange shaped section having a outer diameter larger than the outer diameter of the connection section 73.

The tip end section 65 is a substantially conical section protruding from the flange section 74 toward the gate opening 67 side. The connection section 73, the flange section 74, and the tip end section 65 are integrally constituted.

A flow path 77 is formed at a center of the main body section 76 and the injection section 60. The flow path 77 is provided along the center line 61 and has a function of guiding the molding material to the gate opening 67.

The flow path 77 communicates with a nozzle opening 65a branched into two at the tip end section 65 of the injection section 60. The number of nozzle openings 65a is not limited to two, but may be three or more. With such a configuration, the gate opening 67 has an open gate structure, which is also called a ring gate.

The heater 78a is a coil heater embedded in the main body section 76 and heats the hot runner 75. The heater 78b is a coil heater surrounding an outer periphery of the connection section 73 of the injection section 60, and heats the injection section 60. Heating by the heaters 78a, 78b maintains the molten state of the molding material flowing through the flow path 77.

Return to FIG. 2.

In the plasticizing device 80 including such a configuration, when the material is supplied from the material supply section 8 including a hopper (not shown) to the supply ports 23a provided on a side surface of the flat screw 21a, the material is plasticized by rotation of the flat screw 21a and heating by the heater 38a in the barrel 31, and the material flows into the communication hole 36 from the through hole 35a at the center of the facing surface 11a. Similarly, when the material is supplied from the material supply section 8 to the supply ports 23b provided on a side surface of the flat screw 21b, the material is plasticized by rotation of the flat screw 21b and heating by the heater 38b in the barrel 31, and the material flows into the communication hole 36 from the through hole 35b at the center of the facing surface 11b. "Plasticization" is a concept including melting, which means changing from a solid state to a state having fluidity. Specifically, in the case of a material in which glass transition occurs, plasticization means that the temperature of the material is set to be equal to or higher than the glass transition point. In the case of a material that does not undergo glass transition, plasticization refers to raising the temperature of the material above its melting point.

A part of the material flowing into the communication hole 36 from the two plasticizing sections 20a, 20b is drawn into the branch path 32, and is pressure-fed to the communication hole 36 while the supply amount is controlled by reciprocating drive of the plunger 34. Then, the pressure-fed material is injected from the nozzle section 70 into the molding die 40 fixed by the mold clamping device 50 (FIG. 1).

Return to FIG. 1.

The mold clamping device 50 opens and closes the upper molding die 41 and the lower molding die 42.

The mold clamping device 50 includes a mold clamping motor 51, a decelerator 52, a ball screw 53, and the like. At the time of mold clamping, the mold clamping motor 51 is driven to move a base section 54 on which the lower molding die 42 is mounted in the Z plus direction along the center line 61. At the time of mold opening, the base section 54 is moved in the Z minus direction along the center line 61. The lower molding die 42 is fixed to the base section 54 by a clamp section 64. Similarly, the upper molding die 41 is fixed to a main body of the plasticizing device 80 by a clamp section 63. The base section 54 and a main body of the plasticizing device 80 correspond to the fixing sections of the lower molding die 42 and the upper molding die 41. In other words, the fixing section fixes the molding die 40 for receiving the material. The injection molding device 100 includes the plasticizing device 80, the nozzle section 70 for injecting the material plasticized by the plasticizing device 80, and the fixing section for fixing the molding die 40 for receiving the material.

Further, an ejector pin 59 is incorporated in the base section 54. The ejector pin 59 ejects a molded article at the time of mold opening, thereby releasing the molded article from the molding die 40.

The control device 190 is a control section and is configured by a computer including one or more processors, a storage section, and an input/output interface that inputs and outputs signals to and from outside. The storage section stores a molding program defining an order and a content related to mold opening, mold clamping, injection molding, and removal of a molded article, a program for controlling a number of rotations of the flat screws 21a, 21b, a program for controlling temperatures of the heaters 38a, 38b, and accompanying data. By executing these programs, the control device 190 generally controls the entire injection molding device 100 including the plasticizing device 80.

As described above, according to the plasticizing device and the injection molding device 100 of the present embodiment, the following effects can be obtained.

The plasticizing device 80 includes the flat screw 21a as a first flat screw including the groove forming surface 10a as a first groove forming surface on which the grooves 22 are formed and configured to rotate; the flat screw 21b as a second flat screw including the groove forming surface 10b as a second groove forming surface on which the grooves 22 are formed and configured to rotate; the barrel 31 including the facing surface 11a as a first facing surface facing the groove forming surface 10a and the facing surface 11b as a second facing surface facing the groove forming surface 10b and formed with the communication hole 36 through which the plasticized material is fed outside; and the heaters 38a, 38b as heating sections configured to heat the material supplied to the grooves 22 of the flat screw 21a and the flat screw 21b.

According to this configuration, the plasticizing device includes two plasticizing sections 20a, 20b. Therefore, the plasticizing ability is higher than that of the related art plasticizing device 89 (FIG. 9) having only one plasticizing section 29.

Further, since the facing surfaces 11a, 11b are provided on front and back surfaces of the barrel 31, two plasticizing sections 20a, 20b can be formed by one barrel 31. In addition, since the plasticizing section 20a and the plasticizing section 20b are configured to be symmetrical with respect to the center line 61, an extra protruding portion is not generated as compared with a case in which the configuration is not symmetrical or a case in which one plasticizing section has a large diameter, so that a compact configuration can be achieved. Therefore, the plasticizing device 80 can be configured compactly.

Therefore, it is possible to provide a plasticizing device 80 which has a small size and has a high plasticizing ability.

The groove forming surface 10a as the first groove forming surface and the groove forming surface 10b as the second groove forming surface are located to face each other.

According to this configuration, the plasticizing section 20a and the plasticizing section 20b can have a symmetrical configuration with the center line 61 as a symmetrical axis, and the plasticizing device 80 can be configured compactly.

The plasticizing device 80 includes the drive motor 18a as a first drive section configured to rotate the flat screw 21a; and the drive motor 18b as a second drive section configured to rotate the flat screw 21b.

The control device 190 as a control section individually controls the drive motor 18a and the drive motor 18b.

According to this configuration, the plasticizing ability of the two plasticizing sections 20a, 20b can be individually and optimally controlled.

The heating section includes a heater 38a for the flat screw 21a and a heater 38b for the flat screw 21b.

The control device 190 as the control section individually controls the heater 38a and the heater 38b.

According to this configuration, the materials supplied to the grooves 22 of the flat screw 21a and the flat screw 21b can be individually and optimally heated, so that the plasticized material in an optimal state can be produced.

The plasticizing device 80 includes the branch path 32 communicating with the communication hole 36 and the injection control section 30 as a suction feeding section configured to suck the plasticized material into the branch path 32 or configured to feed the sucked material to the communication hole 36 side.

According to this configuration, the amount of material supplied to the communication hole 36 can be optimally adjusted, and efficiency of injection molding can be enhanced.

The branch path 32 extends along at least one of the groove forming surface 10a and the groove forming surface 10b.

According to this configuration, it is possible to reduce size by providing the branch path 32 along one of the groove forming surfaces.

The communication hole 36 extends along at least one of the groove forming surface 10a and the groove forming surface 10b.

According to this configuration, it is possible to reduce size by providing the communication hole 36 along one of the groove forming surfaces.

The injection molding device 100 includes the plasticizing device 80; the nozzle section 70 configured to inject the material plasticized by the plasticizing device 80; and the fixing section configured to fix the molding die 40 for receiving the material.

According to this configuration, since the injection molding device 100 includes the plasticizing device 80 having a small size and a high plasticizing ability, injection molding can be performed efficiently.

Therefore, it is possible to provide the injection molding device 100 which has a small size and has high molding efficiency.

Second Embodiment

Different Aspect 1 of the Plasticizing Section

Figure 6:
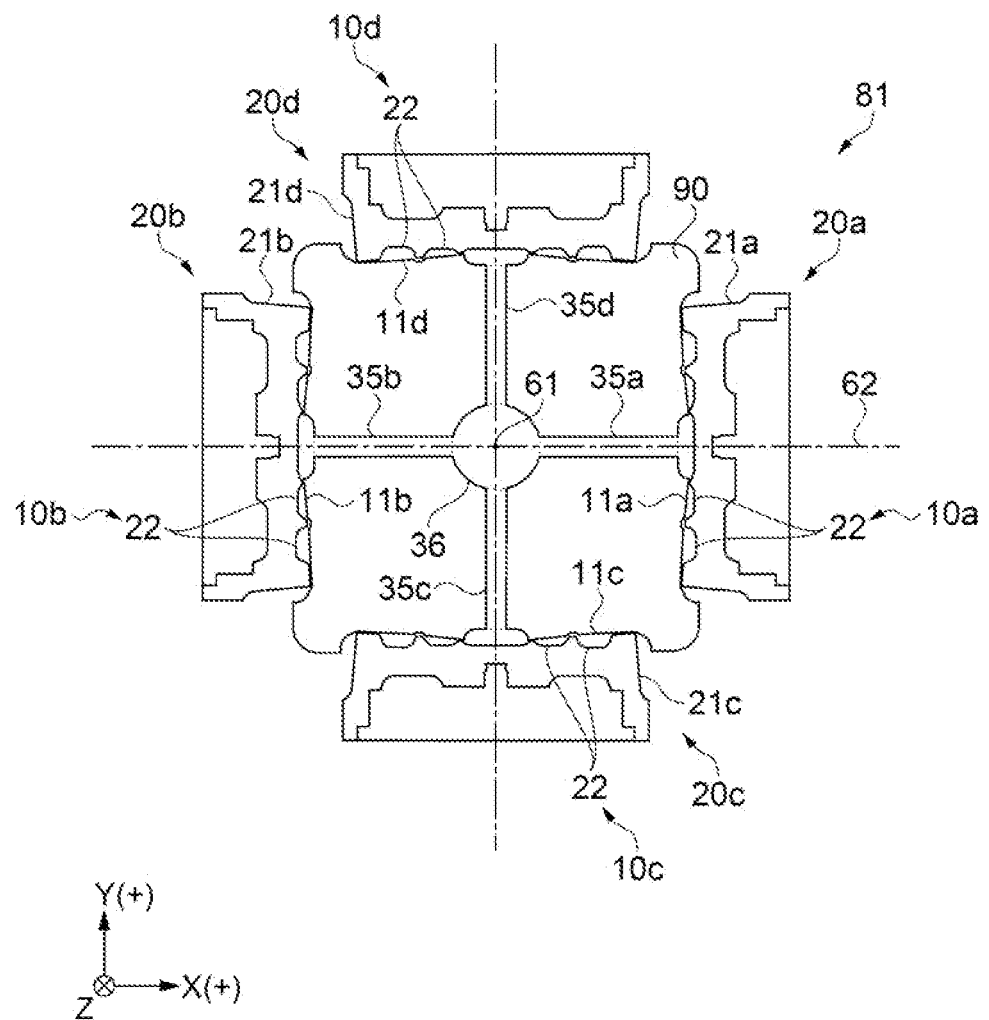
FIG. 6 is a cross-sectional plan view of a plasticizing section according to a second embodiment.

FIG. 6 is a cross-sectional plan view of the plasticizing section according to a second embodiment, and is a cross-sectional plan view at the rotation axis 62 when the barrel 90 is observed from the Z plus direction.

In the above-described embodiment, the plasticizing device 80 is described as including two plasticizing sections, but is not limited to this configuration, and it is sufficient if it includes a plurality of plasticizing sections. For example, the plasticizing device 81 of the present embodiment includes four plasticizing sections.

Hereinafter, the same parts as those in the above-described embodiment are denoted by the same reference symbols, and overlapping explanations are omitted.

As shown in FIG. 6, a plasticizing device 81 according to the present embodiment includes four plasticizing sections 20a, 20b, 20c, 20d around the barrel 90.

The barrel 90 has a square shape centered on the communication hole 36, and includes facing surfaces 11a, 11b, 11c, 11d along four sides thereof. The facing surface 11a and the facing surface 11b are provided on sides that face each other. Similarly, the facing surface 11c and the facing surface 11d are provided on sides that face each other.

A through hole 35a is provided at the center of the facing surface 11a, and the through hole 35a communicates with the communication hole 36. Similarly, each of a through hole 35b of the facing surface 11b, a through hole 35c of the facing surface 11c, and a through hole 35d of the facing surface 11d communicates with the communication hole 36.

The plasticizing section 20a includes the facing surface 11a of the barrel 90 and a flat screw 21a arranged to face the facing surface 11a, and the like. Similarly, the plasticizing section 20b includes the facing surface 11b and a flat screw 21b arranged to face the facing surface 11b, and the like. The plasticizing section 20c includes the facing surface 11c and a flat screw 21c arranged to face the facing surface 11c, and the like. The plasticizing section 20d includes the facing surface 11d and a flat screw 21d arranged to face the facing surface 11d, and the like.

A drive motor is connected to each flat screw, and a heater is provided inside each facing surface of the barrel 90, but illustration is omitted.

A part of the material ejected from the four plasticizing sections 20a, 20b, 20c, 20d into the communication hole 36 is drawn into the branch path 32, and the supply amount is controlled by the reciprocating drive of the plunger 34 (FIG. 1), and is pressure-fed into the communication hole 36. Then, the pressure-fed material is injected from the nozzle section 70 into the molding die 40 fixed by the mold clamping device 50.

As described above, according to the plasticizing device 81 of the present embodiment and the injection molding device 100 including the plasticizing device 81, the following effects can be obtained in addition to the effects of the above embodiment.

The plasticizing device 81 includes four plasticizing sections 20a, 20b, 20c, 20d.

According to this configuration, the plasticizing device 81 includes four plasticizing sections 20a, 20b, 20c, 20d. Therefore, the plasticizing ability is higher than that of the related art plasticizing device 89 (FIG. 9) having only one plasticizing section 29.

Further, by forming the barrel 90 in a square shape and providing the facing surfaces 11a, 11b, 11c, 11d along the four sides thereof, the four plasticizing sections 20a, 20b, 20c, 20d can be configured by one barrel 90. Therefore, the plasticizing device 81 can be configured compactly.

Therefore, it is possible to provide a plasticizing device 81 which has a small size and has high plasticizing ability. According to the injection molding device 100 including the plasticizing device 81, injection molding can be performed efficiently.

Third Embodiment

Different Aspect 2 of the Plasticizing Section

Figure 7:
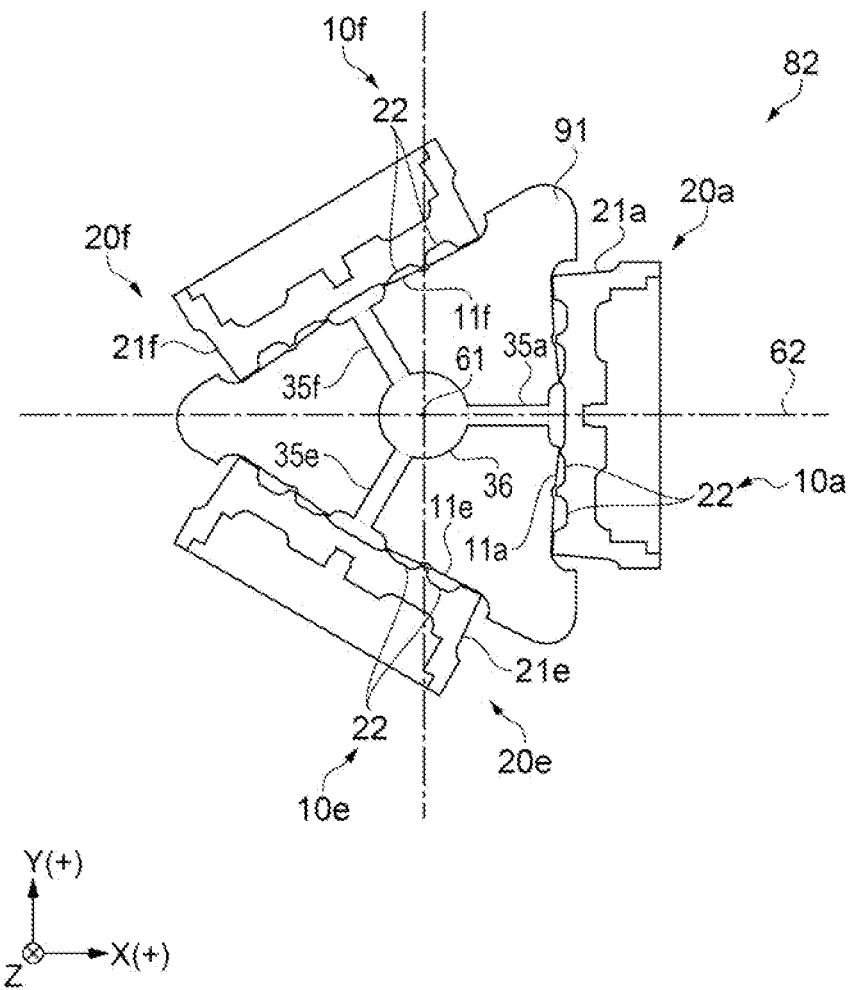
FIG. 7 is a cross-sectional plan view of a plasticizing section according to a third embodiment.

FIG. 7 is a cross-sectional plan view of the plasticizing section according to the third embodiment, and corresponds to FIG. 6.

In the embodiment described above, the plasticizing device 80 includes two plasticizing sections, and the plasticizing device 81 includes four plasticizing sections, but it is not limited to these configuration, and it is sufficient that a plurality of plasticizing sections may be provided around the barrel. For example, the plasticizing device 82 of the present embodiment includes three plasticizing sections.

Hereinafter, the same parts as those in the above-described embodiment are denoted by the same reference symbols, and overlapping explanations are omitted.

As shown in FIG. 7, a plasticizing device 82 according to the present embodiment includes three plasticizing sections 20a, 20e, 20f around a barrel 91.

The barrel 91 has a triangular shape centered on the communication hole 36, and includes facing surfaces 11a, 11e, 11f along three sides thereof.

A through hole 35a is provided at the center of the facing surface 11a, and the through hole 35a communicates with the communication hole 36. Similarly, each of a through hole 35e of the facing surface 11e and a through hole 35f of the facing surface 11f communicates with the communication hole 36.

The plasticizing section 20a includes the facing surface 11a of the barrel 91 and a flat screw 21a arranged to face the facing surface 11a, and the like. Similarly, the plasticizing section 20e includes the facing surface 11e and a flat screw 21e arranged to face the facing surface 11e, and the like. The plasticizing section 20f includes the facing surface 11f and a flat screw 21f arranged to face the facing surface 11f, and the like.

A drive motor is connected to each flat screw, and a heater is provided inside each facing surface of the barrel 91, but illustration is omitted.

A part of the material ejected from the three plasticizing sections 20a, 20e, 20f into the communication hole 36 is drawn into the branch path 32, and the supply amount is controlled by the reciprocating drive of the plunger 34 (FIG. 1), and is pressure-fed into the communication hole 36. Then, the pressure-fed material is injected from the nozzle section 70 into the molding die 40 fixed by the mold clamping device 50.

The shape of the barrel is not limited to a triangle or a square, but may be a polygon such as a hexagon or an octagon. For example, in the case of a hexagonal shape, six plasticizing sections can be provided along the sides. However, it is not necessary to provide the plasticizing sections on all sides, and for example, it is also possible to provide the plasticizing sections selectively on any three sides of the hexagon.

As described above, according to the plasticizing device 82 of the present embodiment and the injection molding device 100 including the plasticizing device 82, the following effects can be obtained in addition to the effects of the above embodiment.

The plasticizing device 82 includes three plasticizing sections 20*a*, 20*e*, 20*f*.

According to this configuration, the plasticizing device 82 includes three plasticizing sections 20*a*, 20*e*, 20*f*. Therefore, the plasticizing ability is higher than that of the related art plasticizing device 89 (FIG. 9) having only one plasticizing section 29.

Furthermore, by forming the barrel 91 in a triangular shape and providing the facing surfaces 11*a*, 11*e*, 11*f* along the three sides thereof, the three plasticizing sections 20*a*, 20*e*, can be configured by one barrel 91. Therefore, the plasticizing device 82 can be configured compactly.

Therefore, it is possible to provide a plasticizing device 82 which has a small size and has high plasticizing ability. According to the injection molding device 100 including the plasticizing device 82, injection molding can be performed efficiently.

Fourth Embodiment

Three Dimensional Shaping Device

Figure 8:
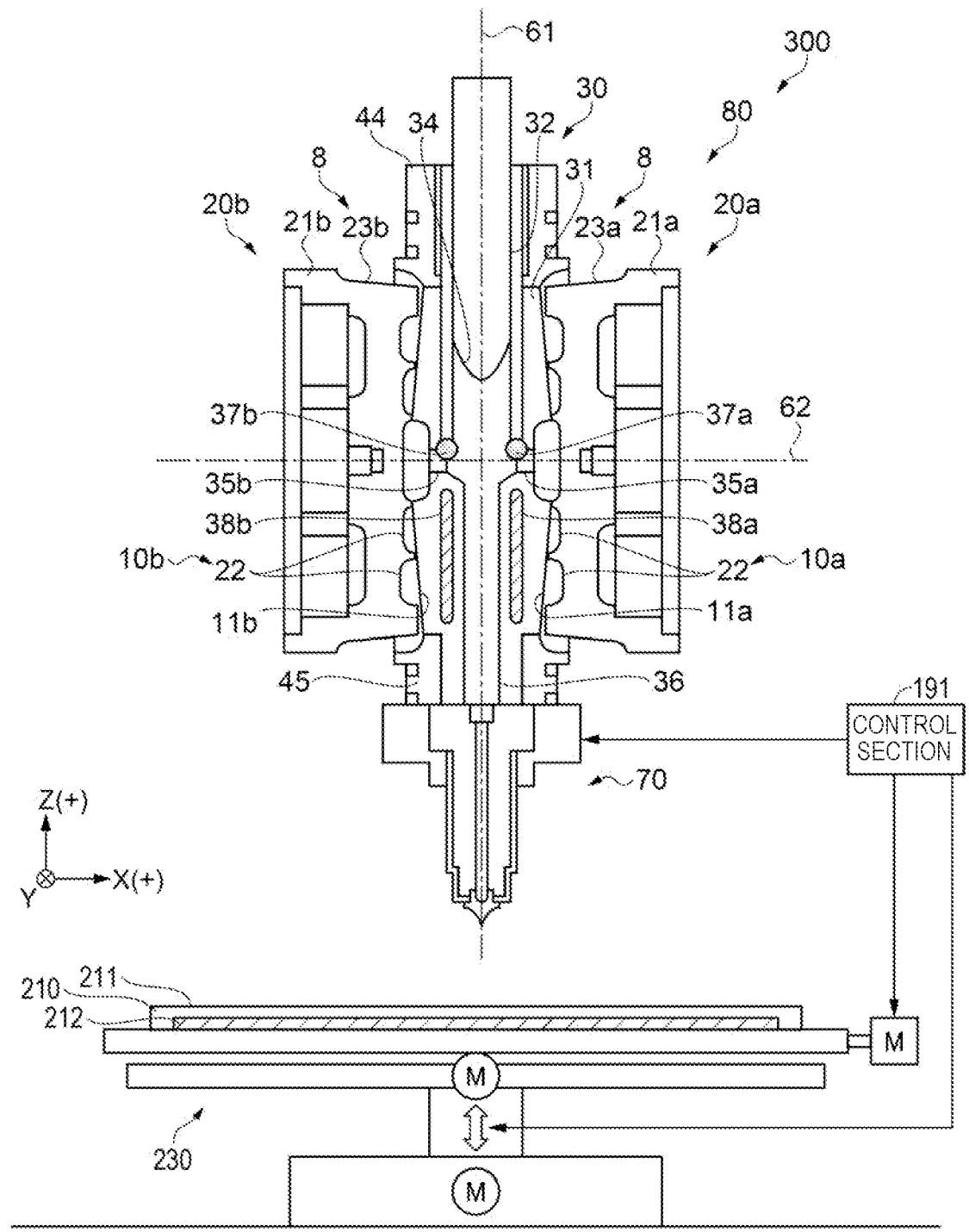
FIG. 8 is a schematic configuration diagram of a three dimensional shaping device according to a fourth embodiment.

FIG. 8 is a schematic configuration diagram of a three dimensional shaping device.

The plasticizing devices 80, 81, 82 of the above embodiments can also be applied to a three dimensional shaping device. Hereinafter, the same parts as those in the above-described embodiment are denoted by the same reference symbols, and overlapping explanations are omitted.

As shown in FIG. 8, a three dimensional shaping device 300 according to the present embodiment includes the plasticizing device 80 for generating and ejecting a shaping material made of a plasticized material, a stage 210 having a shaping surface 211 on which the shaping material is laminated, a position changing section 230 that changes a relative position between the nozzle section 70 and the stage 210, and a control section 191 that controls the position changing section 230, and the like.

The stage 210 is arranged at a position facing the nozzle section 70. In the present embodiment, the shaping surface 211 of the stage 210 facing the nozzle section 70 is arranged so as to be parallel to the X and Y directions, that is, the horizontal direction. At the time of three dimensional shaping, the three dimensional shaping device 300 shapes a three dimensional shaped object by ejecting a shaping material from the tip of the nozzle section 70 toward the shaping surface 211 of the stage 210 and laminating layers. In other words, the three dimensional shaping device 300 includes the plasticizing device 80; the nozzle section 70 configured to eject the material plasticized by the plasticizing device 80; and the stage 210 including the shaping surface 211 on which the material is laminated.

The stage 210 is provided with a stage heater 212 as a heating section. The stage heater 212 suppresses a rapid decrease in the temperature of the shaping material ejected onto the stage 210.

The position changing section 230 changes the relative position between the nozzle section 70 and the stage 210. In the embodiment, the position of the nozzle section 70 is fixed, and the position changing section 230 moves the stage 210. The position changing section 230 is configured by a three axis positioner that moves the stage 210 in three axis directions of X, Y, and Z directions by driving forces of three motors. The position changing section 230 changes the relative positional relationship between the nozzle section 70 and the stage 210 under the control of the control section 191. Note that movement of the nozzle section 70 means moving the nozzle section 70 relative to the stage 210.

Instead of the configuration in which the position changing section 230 moves the stage 210, the position changing section 230 may move the nozzle section 70 with respect to the stage 210 in a state in which a position of the stage 210 is fixed.

Alternatively, a configuration in which the stage 210 is moved in the Z direction by the position changing section 230 and the nozzle section 70 is moved in the X and Y directions, or a configuration in which the stage 210 is moved in the X and Y directions by the position changing section 230 and the nozzle section 70 is moved in the Z direction may be adopted. Even in these configurations, the relative positional relationship between the nozzle section 70 and the stage 210 can be changed.

As described above, according to the three dimensional shaping device 300 of the present embodiment, the following effects can be obtained.

The three dimensional shaping device 300 includes the plasticizing device 80, the nozzle section 70 for injecting the material plasticized by the plasticizing device 80, and the stage 210 having a shaping surface 211 on which the material is laminated.

According to this configuration, since the three dimensional shaping device 300 includes the plasticizing device 80 having a small size and a high plasticizing ability, it is possible to perform 3D shaping stably and efficiently.

Therefore, it is possible to provide the three dimensional shaping device 300 having high shaping efficiency and excellent stability.

What is claimed is:

1. A plasticizing device comprising:
   a first flat screw including a first groove forming surface in which a groove is formed and configured to rotate;
   a second flat screw including a second groove forming surface in which a groove is formed and configured to rotate;
   a barrel including a first facing surface facing the first groove forming surface and a second facing surface facing the second groove forming surface, the first facing surface being formed on a side of the barrel that is opposite to and faces away from the second facing surface that is formed on an opposite side of the barrel, and the barrel being formed with a communication hole through which a plasticized material is fed outside; and
   a heating section configured to heat the material supplied to the grooves of the first flat screw and of the second flat screw.

2. The plasticizing device according to claim 1, wherein the first groove forming surface and the second groove forming surface are positioned to face each other.

3. The plasticizing device according to claim 1, further comprising
   a control section;
   a first drive section configured to rotate the first flat screw; and
   a second drive section configured to rotate the second flat screw, wherein
   the control section individually controls the first drive section and the second drive section.

4. The plasticizing device according to claim 1, further comprising
a control section, wherein
the heating section includes a first heating section for the first flat screw and a second heating section for the second flat screw and
the control section individually controls the first heating section and the second heating section.

5. The plasticizing device according to claim 1, further comprising
a branch path communicating with the communication hole and
a suction feeding section configured to suck the plasticized material into the branch path or configured to feed sucked material to the communication hole side.

6. The plasticizing device according to claim 5, wherein the branch path extends along at least one of the first groove forming surface and the second groove forming surface.

7. The plasticizing device according to claim 1, wherein the communication hole extends along at least one of the first groove forming surface and the second groove forming surface.

8. An injection molding device comprising:
the plasticizing device according to claim 1;
a nozzle section configured to inject a material plasticized by the plasticizing device; and
a fixing section configured to fix a molding die for receiving the material.

9. The plasticizing device according to claim 1, wherein the first flat screw and the second flat screw are each configured to rotate about a first axis,
each of the first facing surface and the second facing surface are aligned along a second axis that is arranged orthogonal to the first axis, and
the communication hole extends along the second axis.

* * * * *